(12) United States Patent
Southwell (10) Patent No.: US 6,392,801 B1
(45) Date of Patent: May 21, 2002

(54) WIDE-ANGLE RUGATE POLARIZING BEAMSPLITTER

(75) Inventor: William H. Southwell, Thousand Oaks, CA (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 56 days.

(21) Appl. No.: 09/670,799

(22) Filed: Sep. 27, 2000

(51) Int. Cl.[7] ............................................... G02B 27/28
(52) U.S. Cl. ....................... 359/487; 359/495; 359/498; 359/583
(58) Field of Search ................................ 359/487, 888, 359/495, 498, 583

Primary Examiner—Audrey Chang
Assistant Examiner—Craig Curtis
(74) Attorney, Agent, or Firm—Koppel, Jacobs, Patrick & Heybl (57) ABSTRACT

A polarizing beamsplitter includes an optical medium and a rugate filter embedded therein. The rugate filter has an average refractive index which varies with position on the rugate plane in the non-thickness direction, where the averaging is across the rugate film in the thickness direction. The variation in the rugate's average index compensates for variations in incident angle across a cone of a divergent light beam. In one embodiment, the period of the rugate is substantially constant across its surface. Most preferably, the amplitude of the rugate index variation has an apodizing amplitude envelope superimposed thereon to aid in coupling the rugate to a surrounding optical medium.

25 Claims, 4 Drawing Sheets

WIDE-ANGLE RUGATE POLARIZING BEAMSPLITTER

BACKGROUND OF THE INVENTION

1. Field of the Invention

This invention relates to optical polarizing devices generally, and more specifically to rugate polarizing beamsplitters for narrow wavelength bands.

2. Description of the Related Art

A common optical element known as a "MacNeille polarizer" includes two right angle prisms, one of which has a multilayer dielectric coating on its hypotenuse face. The two prisms are bonded together with an optical quality cement to form a cube, with a planar refractive transition slicing diagonally across the cube where the two prisms are joined on a face. The transition partially reflects and partially transmits incident light, thereby splitting a beam. At the transition a plane of incidence is defined by two vectors, one in the direction of light propagation, and the other normal to the surface. The component of the light's e-field in the plane of incidence is referred to as the "P-polarization" component; the component in a plane perpendicular to the plane of incidence is referred to as the "S-polarization". By choosing the proper angle for given prism materials with different refractive properties, it is possible to satisfy well known "Brewster condition", which causes the P-polarized components to be transmitted while the S-polarization is reflected. Thus, a beam can be split into S and P polarized beams.

A more recent refinement of the polarizing beamsplitter is described in U.S. Pat. No. 5,828,489 to Johnson et al. (1998). This patented beamsplitter uses a gradient index film, specifically a "rugate" filter, having an index of refraction which oscillates with depth into the film. The rugate filter is embedded in an optical medium at an angle with respect to an incident beam. This patented beamsplitter arrangement efficiently reflects S-polarized light at specific narrow wavelengths, while transmitting S-polarized light at other wavelengths (and P-polarization at all wavelengths). This property is often useful when working with narrow band optical sources (such as lasers).

The rugate polarizing beamsplitter of the Johnson patent can only operate within certain constraints, however. For best polarization selection and narrow pass-band, the device requires that the incident radiation be very nearly parallel, plane waves propagating in a single direction, without divergence of convergence. This requirement results from a limitation: First, for polarization separation, the angle of incidence must match the Brewster angle (given the high and low index of refraction of the rugate filter coating or the high and low index of refraction of the layer stack in the MacNeille polarizer). As a result of this constraint, the index of the embedding medium limits the choice of the beamsplitter's usable geometry. Second, the chromatic pass-band of the rugate filter is sensitive to the angle of incidence. Therefore, ideal pass and reflection characteristics are only approachable at a unique angle of incidence (for a given filter).

Figure 1:
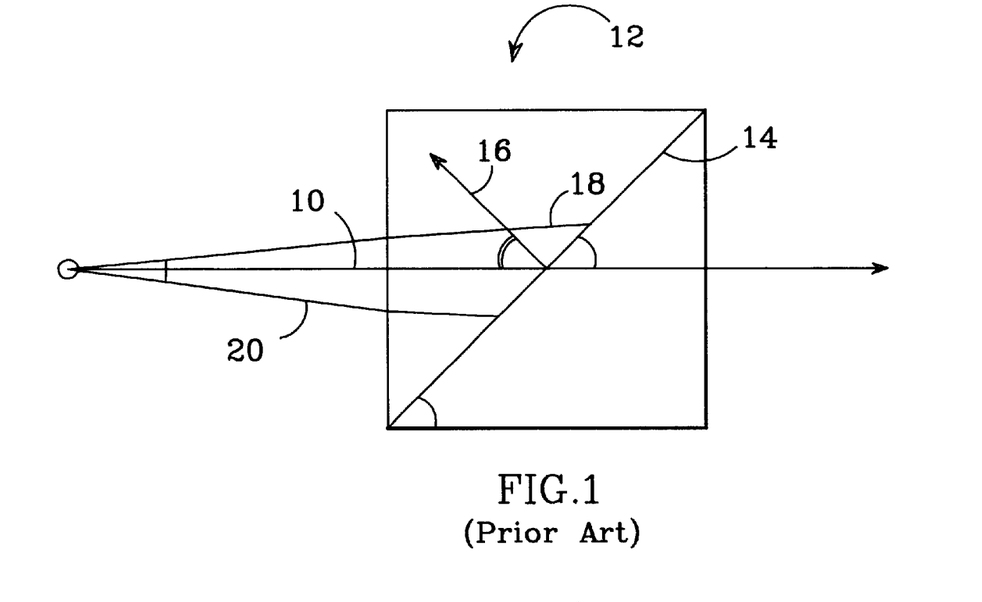
FIG. 1 is a plan view of a prior beamsplitter, including two right angle prisms joined with an embedded rugate filter between the hypotenuse faces.

FIG. 1 shows a prior art narrow wavelength polarizing beamsplitter (adapted from the Johnson patent) in the path of a divergent light beam. The view is simplified to show only one dimension of divergence, but the principle is representative of the situation with any divergent beam. Assume that the chief ray 10 enters the cube 12 as shown, and is incident on the rugate film 14 at angle φ (to the normal 16). For best operation, the period of rugate film and the angle θ of the rugate can be chosen appropriately, according to the teachings of the Johnson patent and known optical principles. However, it should be apparent that due to divergence of the beam, other rays such as to Top ray 18 and Lower ray 20 which strike the rugate at some distance from the optical center (intersection of the chief ray with the rugate) will have angles of incidence which differ from θ. Thus, in the prior art device the rugate period and the angle of incidence will not be optimized for all rays of a divergent beam.

A previously described rugate polarizing beamsplitter is thus not able to satisfy the requirements of wide angle operation, while maintaining narrow band selection and polarization selectivity.

SUMMARY OF THE INVENTION

In view of the above problems, the present invention is a polarizing beamsplitter which includes an optical medium and a rugate filter embedded therein. The beamsplitter efficiently reflects S-polarized light at specific narrow wavelengths, while transmitting S-polarized light at all other wavelengths (and P-polarization at all wavelengths).

In a first embodiment, the invention includes a rugate filter arranged in the path of a beam in such a way that the angle of beam propagation within the rugate filter is substantially equal to 45 degrees, notwithstanding any variations in incident angle across the rugate. For the special case of a collimated beam, this requirement can be satisfied by orienting the rugate filter at an angle to the beam, wherein said angle satisfies Snell's law given the average index of the rugate, the index of the embedding optical medium, and the requirement that the angle of the beam within the rugate is 45 degrees. The index of the optical medium need not match the average index of the rugate. For the more general case of a divergent (or convergent) beam, the first embodiment includes a rugate filter with an average refractive index which varies with position on the rugate plane in the non-thickness direction. The variation in the rugate's average index compensates for variations in incident angle across the light beam (for example, across a divergent cone).

In the second embodiment, the period of the rugate varies across the surface of the rugate, while the average index of the rugate remains substantially constant across the surface (does not vary with position in the non-thickness directions). A predetermined variation in the period is imposed to compensate for variations in incident angle across the light beam (for example, across a conically divergent beam).

More generally, an unlimited number of variations of the invention are possible which vary both the average rugate index and the rugate period as functions of position on the rugate surface, according to a predetermined relation chosen to compensate for variations in incident angle across light beam.

These and other features and advantages of the invention will be apparent to those skilled in the art from the following detailed description of preferred embodiments, taken together with the accompanying drawings, in which:

DETAILED DESCRIPTION OF THE INVENTION

The invention is a rugate polarizing beamsplitter capable of operating with angularly divergent light beam. For example, in a typical embodiment the invention operates in a ±15 degree cone, which is approximately equivalent to a f/1.93 aperture.

Figure 2:
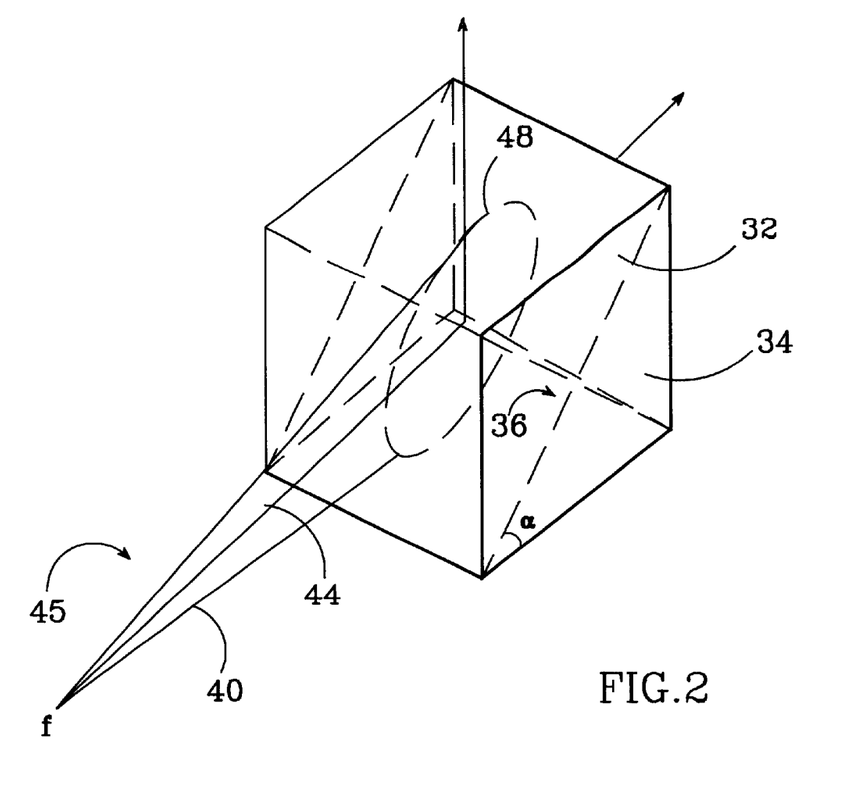
FIG. 2 is a perspective view of a beamsplitter in accordance with the invention.

As shown in FIG. 2, the invention is typically and most suitably used with light rays diverging conically from a focal point f. A beamsplitter cube 30 is made up of two optically joined prisms 32 and 34 (together providing an optical medium), with a rugate filter 36 deposited on the prisms' diagonally joining face, thus embedded in the optical medium. The materials and construction of the prisms and cube can suitably be similar to those described in U.S. Pat. No. 5,828,489, but the rugate filter 36 of the present invention is quite different from that previously described.

In operation the cube 30 is placed in the optical path of a conically diverging beam 40, which diverges from a focal point f. We define a chief ray 44 at the center of the cone of the beam 45, and further define an "optical center" as the intersection of the chief ray 34 with the plane of rugate filter 36. (The intersection of the light cone 45 with the plane of the rugate describes an ellipse 48, one of the conic sections of classical geometry.) Note that the incident angle of the light beam 45 on rugate filter 36 varies across the cone.

Figures 3, 4, 5:
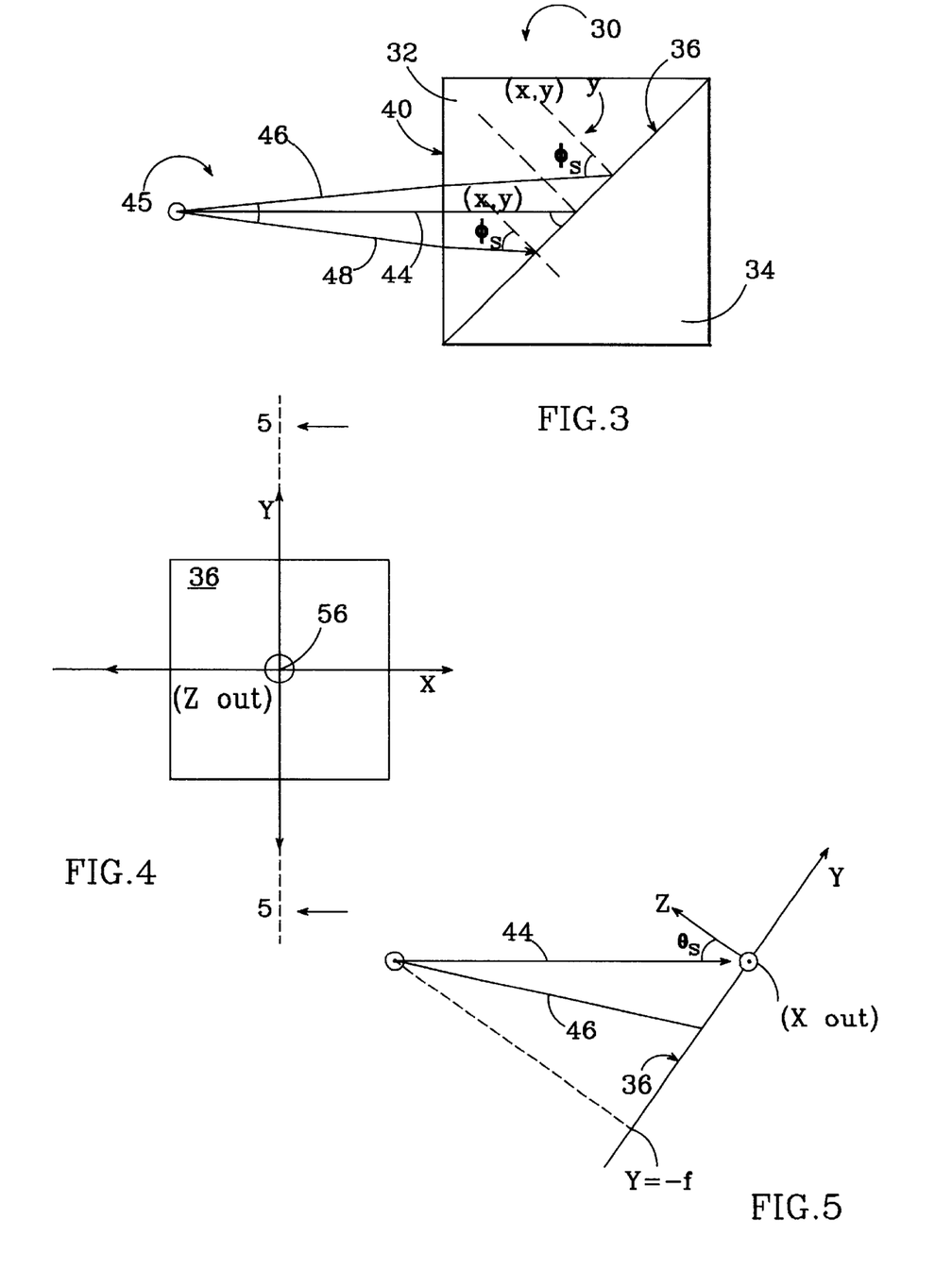
FIG. 3 is an elevation view of the beamsplitter of FIG. 2.
FIG. 4 is a plan view of a beamsplitter in accordance with the invention, with a convenient reference coordinate system superimposed.
FIG. 5 is a sectional view taken along section line 4 in FIG. 4.

The angular variation across the cone is more apparent in elevation view in FIG. 3 (although only one dimension of angular variation is shown, for simplicity, similar angular variation exists in other planes, as will be recognized). In a typical embodiment, the half cube 32 has a refractive index higher than that of air (1.75 is typical). Thus, refraction will reduce the divergence of the light beam 45 somewhat. If the chief ray impinges on the front face 40 of the cube at a right angle, the the uppermost ray 46 and lowermost ray 48 will be refracted slightly toward the normal. In a typical embodiment, with a prism of refractive index of 1.75, an initial cone of divergence of ±15 degrees in air would be reduced to a ±8.5 degree cone within the prism.

It is convenient to illustrate the invention in terms of the common but special case in which the rugate 36 lies in a plane at a 45 degree angle to the chief ray as shown in FIG. 3. The equations which follow can applied generally to other angles of incidence, as required. The invention is not intended to be limited to a 45 degree angle of incidence, or to a 45 degree beamsplitter cube as shown.

In accordance with the invention, the rugate filter 36 has an average index of refraction which varies with position over the surface of the filter. This index is varied in such a way that a zero P-polarization reflection is maintained over the cone of incidence, while the narrow band pass characteristic is also maintained over the cone of incidence. For this to occur, we have discovered that the angle of the optical rays within the rugate filter, with its local average refractive index $n_a$, should be substantially equal to 45 degrees. Most preferably, the angle of rays in the rugate should exactly equal 45 degrees; for adequate performance the angle within the rugate should be within ±3° of 45 degrees.

This can be demonstrated as follows. For a MacNeille polarizer, the P-component reflection of a rugate line is suppressed when the following condition is applied:

$$\tan \theta_L n_H/n_L, \quad (\text{eqn.1})$$

where $n_H$ and $n_L$ and the high and low values of the sinusoidal refractive index variation of the rugate coating. $\theta_L$ is the angle propagation of the light of the low part of refractive index cycle. However, in a rugate with sinusoidal index variation, there are no discontinuous bransitions of the index of refraction. Rather there is a sinusoidal variation of the index, according to the equation:

$$n(t) = n_a + \frac{n_p}{2}\sin\left(\frac{4\pi}{\lambda_n}n_a t\right) \quad (\text{eqn. 2})$$

where $n_a$ is the average index, $n_p$ is the peak to peak variation in rugate index, and t is the thickness dimension into the rugate film in a normal direction.

In terms of the refractive index average $n_a$ and sine wave amplitude $n_p/2$, we have, $$n_H=(n_a+n_p/2) \text{ and } n_L=(n_a-n_p/2). \quad (\text{eqn.3})$$

The rugate filter is deposited on the hypotenuse of a prism imbedded on another such prism. Consequently, the light incident on the rugate coating is in the substrate $n_s$ at an angle $\theta_s$ which is related to $\theta_L$ by Snell's law, $$n_L \sin \theta_L = n_s \sin \theta_s. \quad (\text{eqn.4})$$

Writing the sin as $\tan/[1+\tan^2]^{1/2}$ and using Equations (1), (2) and (3) above, Equation (4) becomes, $$(n_a+n_p/2)/[1+\{(n_a+n_p/2)/(n_a-n_p/2)\}^2]^{1/2}=n_s \sin \theta_s. \quad (\text{eqn.5})$$

an approximate expression for the normal incidence bandwidth B is given by, $$B=n_p/(2n_a). \quad (\text{eqn.6})$$

This leads to the following equation for the average index of the rugate, $$n_a=n_s \sin \theta_s[1+\{(1+B)/(1-B)\}^2]^{1/2}/(1+B), n_a \approx n_s \sin \theta_s 2^{1/2}(1+3B^2/2). \quad (\text{eqn.7})$$

For small bandwidths, up to 8%, Equation (7) may be approximated to within 1% error by the expression, $$n_a = n_s \sin\theta_s \sqrt{2} \text{ or } \theta_s = \text{ArcSin}\left[\frac{N_a}{n_i \sqrt{2}}\right] \quad (\text{eqn. 8})$$

It is interesting to note that this result is independent of $n_L$, $n_h$ or $n_p$. Equation (8) provides a means to select the average rugate index for a given prism material or angle. $\theta_s$ will be 45 degrees for a right angle prism, making a beam splitting cube. The angle α opposite the hypotenuse is 45 degrees for a right angle prism. Other angles of incidence may be used, in which case for normal incidence prism entrance and exit surfaces, the vertex angle is given by, $$\alpha=\pi-2\theta_s. \qquad \text{(eqn.9)}$$

For a collimated beam, Equations (8) and (9) are the design rules of thumb for polarization rugate beam splitters. If one desires to use a cube, then $\sin \theta_s = 1/\sqrt{2}$. Thus, according to Equation (7), one must select $n_a = n_s$, the average index must be that of the prism substrate. On the other hand, one might elect to use two equilateral prisms, where $\theta_s = 60°$. In this case $\alpha=60°$ and $n_a = 1.2247 n_s$. Thus, if one selects $n_s = 1.47$ then the average index will be $n_a = 1.80$. Or if $n_s = 1.52$, then $n_a = 1.86$.

Another design rule is necessary for polarizing beam splitters. Since the coating is deposited and thickness monitored at normal incidence, it is necessary to determine what is the normal incidence rugate period $\lambda_N$ that when placed at an angle $\theta_s$ in the incident medium will produce the stop band at the design wavelength $\lambda$.

The expression relating these quantities is (see Equations (70) and (71) in "spectral response calculations of rugate filters using coupled-wave theory", by W. H. Southwell, J. Opt. Soc. Am. A,5, 1558–1564 (1988).)

$$\lambda_N = \lambda/\cos\theta_a, \qquad \text{(eqn.10)}$$

where $\theta_a$ is the angle of propagation in the rugate filter. From Snell's law we have, $$n_a \sin\theta_a = n_s \sin\theta_s, \qquad \text{(eqn.11)}$$

so that, $$\lambda_N = \lambda/[1-n_s^2 \sin^2\theta_s/n_a^2]^{1/2}. \qquad \text{(eqn.12)}$$

Using Equation (7) above this reduces even further, $$\lambda_N = \lambda\sqrt{2}. \qquad \text{(eqn.13)}$$

Thus, for example, if the polarization beam splitter is designed to operate at 550 nm, then the normal incidence rugate line is at 550(1.414)=777.8 nm.

This is a remarkably simple result. When the polarization condition given by Equation (7) is satisfied, then the normal incidence rugate period is given by the square root of two times the design wavelength, regardless of the substrate index, the angle of incidence, the rugate average index, or the bandwidth of the stop band. Furthermore, the polarization condition itself, Equation (7), is also independent of the bandwidth of the rugate stop band for small bandwidths.

The above result, that the angle of the rays in the rugate should be equal to 45 degrees, can be used to calculate a preferred variation of rugate average index ($n_a$) as a function of position on the rugate surface, to compensate for a divergent beam in accordance with the invention. From Snell's law, it follows that $$n_s \sin\theta_s = n_a \sin\theta_a \qquad \text{(eqn.14)}$$

where $\theta_s$ is the angle of a ray in the prism (embedding optical medium) where it intersects the rugate coating, $n_a$ is the average index of refraction of the rugate, and $n_s$ is the index of refraction of the optical medium (32 and 34) on FIGS. 2 and 3.

It should be understood that the average index of refraction, $n_a$, refers to a scalar function of position which assigns to each position on the surface an average value of the index of refraction at that position on the rugate surface, where the averaging is over the thickness dimension of the rugate (i.e., depth into the coating). Thus, an average value $n_a$ is associated with each position on the rugate surface. The rugate index of refraction will typically vary in the thickness direction according to Equation 2, above.

Within a divergent cone of rays the $\theta_s$ will vary according to the displacement of the ray from the optical center (intersection of chief ray with the rugate). To compensate, a first embodiment of the invention varies the value of $n_a$ with position on the rugate, according to the equation:

$$n_a = \sqrt{2} n_s \sin\theta_s \qquad \text{(eqn.15)}$$

For example, in a specific embodiment where $\theta_s$ varies between 36.5 and 53.5 degrees in a divergent cone, for an optical medium with n=1.75 (optical glass) the average index of refraction of the rugate is varied by the invention between 1.523 and 2.040 (which is within the range of refractive index values achievable by co-evaporation of oxides).

To most precisely compensate for the variation in angle of incidence across the incident cone, $n_a$ should vary according to the invention approximately according to a specific function of position as measured from a defined optical center. One suitable coordinate system to define this function is illustrated in FIGS. 4 and 5. FIG. 4 is plan view showing the rugate plane, with a set of axes superimposed. The Z axis points out of the picture plane, normal to the rugate surface. FIG. 5 shows an elevation view of the beamsplitter cube with a diagonal rugate 36 (here shown at a typical 45 degree angle). The Z and Y axes are labeled, with an origin 56 at the intersection of the chief ray with the rugate.

In the coordinate system illustrated any position in the rugate filter plane is specified by a vector r=(x,y,0). All optical ray vectors originate from the focal point f, which is at the point s=(0,-f,-f) in the coordinate system. Thus, the ray vector at a point r is given by v=r-s=(x,y+f,f). Since the normal vector at any point in the filter plane is n=(0,0,1), the dot product of v and n gives the cosine of the angle of incidence $\theta_s$.

$$\cos\theta_s = v \cdot n / |v| f / [x^2 + (y+f)^2 | f^2]^{1/2} \qquad \text{(eqn.16)}$$

Thus, the preferred index of refraction is given, for each point on the filter plane, by the equation:

$$n_a = \sqrt{2} \cdot n_s \left[ 1 - \frac{1}{\left\{ \left(\frac{x}{f}\right)^2 + \left(\left(\frac{y}{f}\right)+1\right)^2 + 1 \right\}} \right]^{\frac{1}{2}} \qquad \text{(eqn. 17)}$$

This equation reveals a circular symmetry about a point not at the center of the filter, but at a point X=0 and Y=–f. The center of symmetry could, and typically would, lie outside the filter.

Figure 6:
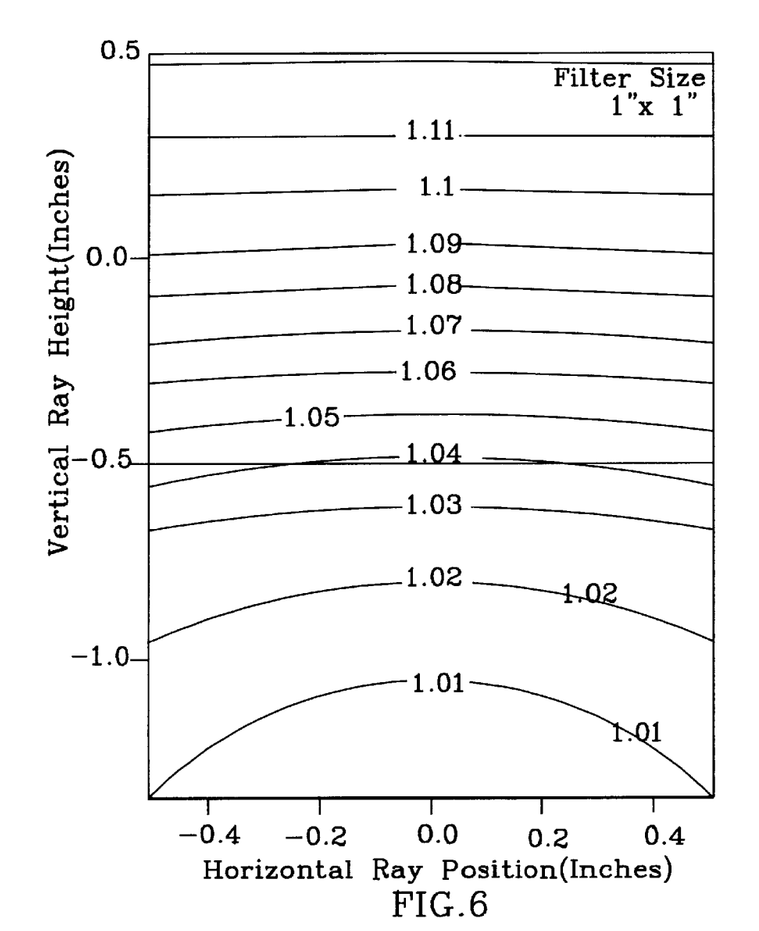
FIG. 6 is multi-curve graph showing dependence of refractive index on position for a rugate filter in accordance with the invention.

FIG. 6 is a multivariate plot of the normalized average index of refraction for a typical rugate filter in accordance with the invention, for a specific polarizing beamsplitter with a 45 degree filter plane, a 1×1 inch filter surface, a 15 degree optical cone, and with the filter embedded in an optical medium of refractive index equal to 1.75. The various curves are labelled for different y values, and the curve for each y value shows variation of index as a function of x position.

Obviously, other coordinate systems could be differently defined which would yield different equations but equivalent relationships between the average refractive index and position on the rugate, such that the S polarization component is substantially completely reflected, while the P polarization component is substantially completely transmitted, for all rays within a cone. Such variations are also within the scope of the invention.

A filter constructed according to Eqn. 17 or an equivalent relationship is assured of being a polarizer for all angles in a given cone, and for all wavelengths within the rugate reflection band. The p-polarization is transmitted for all angles in the cone and all wavelengths. A specific rugate thickness gradient is not necessary. Instead, the gradient of the average index of refraction compensates for the angle variation across the rugate.

Figure 7:
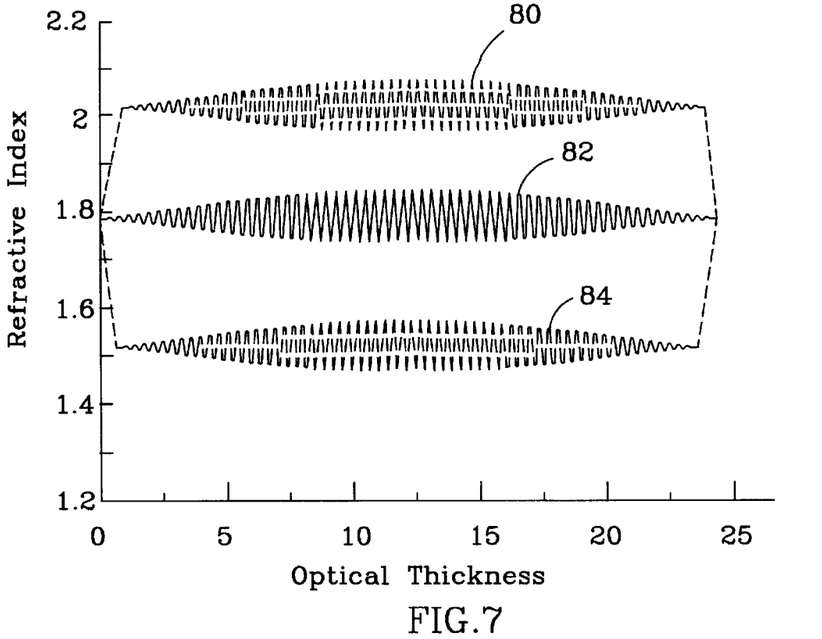
FIG. 7 is a graph of refractive index as a function of depth into a rugate in the thickness direction, showing three functions corresponding to three different positions on a rugate filter of the invention.

FIG. 7 shows plots of typical rugate refractive indices in certain planes as a function of depth into the rugate, in accordance with the invention. The rugate period is given by $\lambda/(2n)$, where $\lambda$ is the desired wavelength of the light source (or rugate selected wavelength). The top curve 80 is for a ray at the top of the filter, with incident angle of 53.2671 degrees and $n_{av}$ of 2.04; the center curve 82 is for $\theta=45$ degrees, $n_{av}=1.8$, the lower curve 84 is for $\theta=36.733$ degrees, $n_{av}=1.523$.

Bandwidth of the rugate varies as $n_p/n_{av}$. Most preferably, quintic functions are applied at the rugate interface to match the (oscillating) rugate index to the constant index of the optical medium in which it is embedded. See U.S. Pat. Nos. 5,828,489 and 4,583,822 for discussion of the use of quintic functions to minimize refractive index discontinuity between the rugate filter and the embedding medium.

Figure 8:
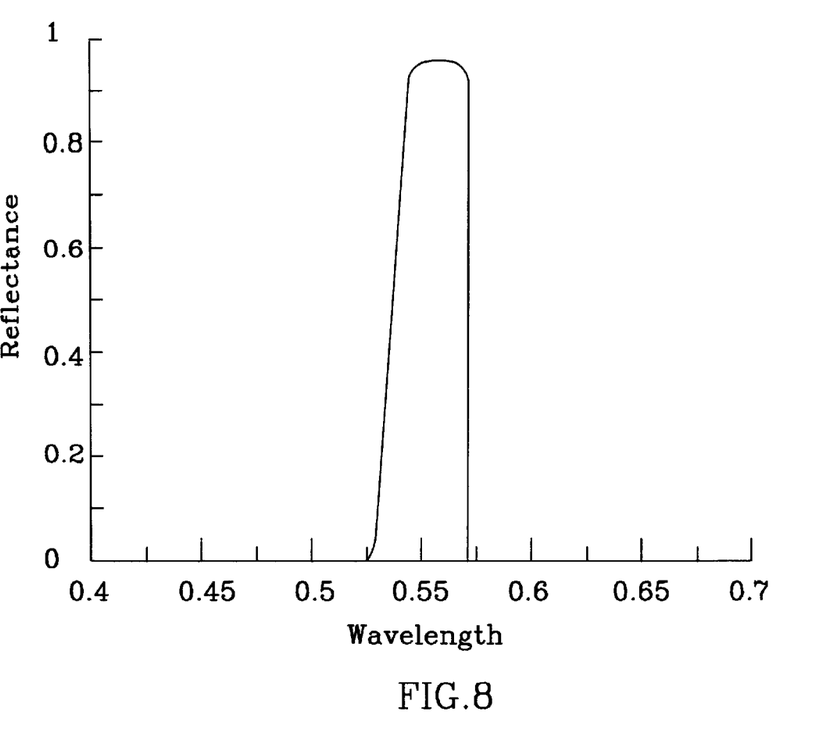
FIG. 8 is a graph of a typical passband characteristic of the invention, showing s-component reflection vs. wavelength for an exemplary rugate polarizing beamsplitter.

FIG. 8 shows a typical pass band characteristic for the exemplary rugate of FIG. 6. Reflectance of the S-component of polarization is high within the narrow pass-band centered around 546 nm, and cuts off sharply outside the passband. The reflection of the P-component is near zero at all wavelengths and for all rays within the cone.

A special case of the invention addresses the special case where divergence of the beam is zero (i.e., a collimated beam). In accordance with the invention, the angle $\theta$ of the beam within the rugate is constrained to be substantially 45 degrees, to produce the polarizing beamsplitter. This condition is independent of the high and low extremes of the rugate refractive index. The rugate average index can also be manufactured to produce this condition for almost any given angle of incidence in the embedding optical medium. Thus, the beamsplitter of the invention is usable with a wide range of optical media and over a wide range of optical geometries. The index of the embedding optical medium may be higher or lower than that of the rugate.

In order to obtain a suitably inhomogeneous, spatially varying average index of refraction for the rugate, some suitable method of coating must be used to fabricate the rugate filter in accordance with the invention.

One general method for fabricating rugates is by applying very thin layers of two different coating materials in alternation, where each layer is less than ¼ wavelength thick. One coating material has a higher, and the other a lower, index of refraction. With such thin layers the effect is the equivalent of a thicker layer of average index. To vary the index, many such layers are applied while varying the relative amount or thickness of the high and low index components. Thus, to create a sinusoidal rugate, the ratio of the high to low index coating components is varied more or less sinusoidally. Suitably, the amount is modulated by varying the rate of deposition. Various conventional techniques for deposition are known: for example, laser evaporation or sputtering of dielectric materials.

Typical materials usable for the higher index coating component include: $TiO_2$ and $Nb_2O_5$. Typical dielectric materials usable for the lower index coating component include $SiO_2$ and $Al_2O_3$.

As previously noted, the desired profile of average index of refraction for the rugate filter will have circular symmetry about a point outside the beamsplitter. This permits the use of coating techniques which spin the optical piece about a center, as illustrated in FIG. 8, to achieve circular symmetry. Individual half-beamsplitters 90 are suitably mounted in an arc or circle on a rotatable platform. A vapor source is such as a sputtered dielectric source is disposed in proximity to the platform at fixed location, so that the beamsplitters will pass the source at one point as the platform rotates in arc 92. Dielectric material from the source will deposit upon the surface of the beamsplitter components as they pass the source, travelling in arc 92. A cutout mask 94 is interposed between the vapor source and the (above the picture plane) half-beamsplitters 40, to control the amount of deposition in relation to position on the surface of the component, in accordance with a pre-defined, desired profile or function. For the rugates of the present invention, the components will be rotated about a position f which is outside the face of the component. The rotation during coating should be fast enough to insure that the application has circular symmetry.

Figure 9:
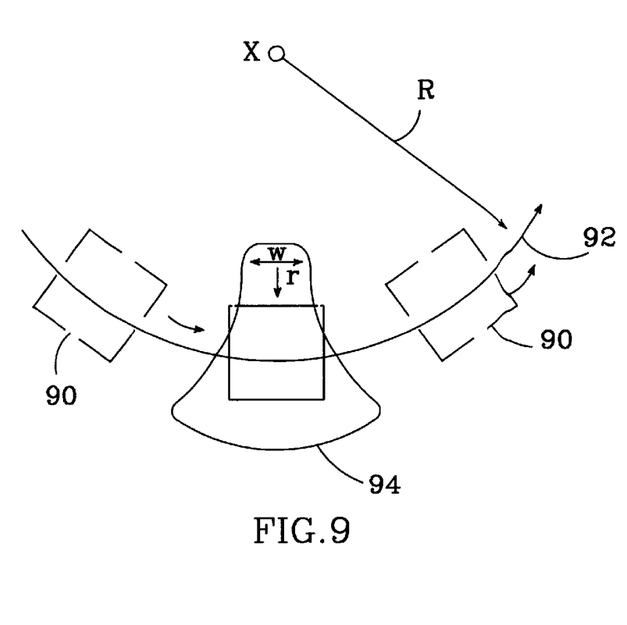
FIG. 9 is a plan view of one method which can be used to fabricate rugate filters with spatially varying average refractive indices, suitable for use in the invention.

The mask 94 exemplifies those used to fabricate the beamsplitter of the invention. The width w varies in relation to displacement in the radial direction r; thus, the length of exposure that a given position the optical surface varies in relation to position in the r direction. Therefore, the amount (thickness) of dielectric deposited varies as a function of the r coordinate. The width profile of the mask can be readily calculated based on the equations, above, to produce average index variations as desired.

Although only one mask is shown in FIG. 9, two such masks are preferably used to alternately deposit high and low index materials to produce an oscillating index of a rugate filter. Referring back to FIG. 7, the index of refraction should vary in relation to the coatings' thickness dimension in an oscillating manner (as in individual curve 82). This oscillation can be produced by modulating the relative rate of deposition of high and low index dielectrics, thus producing at each depth a specific desired index of refraction. Simultaneously, the average index (averaged over all depths in the thickness dimension, through the rugate) has variation as a function of position on the rugate (x,y). This variation in average index $n_{av}$ is fabricated preferably by providing specific width profile of the mask 94.

To fabricate the variation in average index of the rugate in accordance with the invention, it is extremely preferably that the masks used for the low and high refractive index materials differ from one another. One suitable method is to not mask the low index material and vary the high index material by a contoured mask, so that a portion of the filter surface will have a higher relative proportion of the high index coating.

The solution of the invention-varying the average rugate index across the filter—is superior to alternate approaches which might be attempted for wide-angle, narrow band beamsplitters. As discussed above in connection with the background of the invention, to accommodate widely varying angles of incidence it is unsatisfactory to merely fabricate a rugate with a wideband filter. Such an approach produces a rugate which reflects significant S-polarized light across the entire visible spectrum (assuming at least a 15 degree conical field). Thus, spectral selectivity is largely defeated. It is also inadequate to compensate by fabricating a rugate which varies in thickness across its surface. This approach produces a rugate period which varies across the filter, so that reflection occurs at a given wavelength across the divergent cone of the beam. However, at extreme angles of the incident cone, such a rugate significantly reflects P-components of the beam. Thus, the polarization selectivity suffers. In contrast, varying the average rugate index of refraction across the filter provides spectral and polarization selectivity across a wide angle cone.

In a second embodiment of the invention, the average index of the rugate is maintained at a substantially constant value with respect to position on the rugate surface, while the period of the rugate is varied to compensate for variations in incident angle of the beam across the rugate surface. The variation in period is easily calculated by considering equation 2, above. Note that in equation 2, $P=\lambda/2n_a$ where P is the period of the reguate cycle, $\lambda$ is the wavelength of the rugate line center. Thus, an equivalent rugate can be realized by holding the rugate average index at a constant while varying the period of the rugate during fabrication, according to the relationship:

$$P(\theta_s)=\lambda/2n_a(\theta_s) \qquad \text{(eqn.18)}$$

where $n_z(\theta_s)$ can be calculated from the optical geometry, or in a special case (conical divergence) in terms of x,y as discussed previously.

It should also be evident that a similar result could be obtained by varying both the period and the average index of the rugate filter as functions of position on the rugate filter surface, to compensate for variations in incident angle across the beam. The variation in period and average index should satisfy equation 19 for all points on the surface and within the beam spot. Varying both indices in complementary fashion to accomplish such compensation is also within the scope of the invention. A potentially unlimited number of variations are possible between the two extreme cases: (1) varying the average rugate index, while holding the period constant, and (2) varying the period, while holding the average index constant.

While several illustrative embodiments of the invention have been shown and described, numerous variations and alternate embodiments will occur to those skilled in the art. Alternate means of coating deposition are known and could be employed. Various different apodizing functions and beamsplitter geometries could be employed. The rugate variations could be tailored for either a divergent or a convergent beam. The divergence (or convergence) of the optical cone could be greater or lesser. A cubic beamsplitter is illustrated in the figures merely because such a shape is conventional and familiar, not by way of limitation. Various optical media could be employed, provided that the appropriate adjustments are made in calculating the desired rugate and optical parameters. Both wide-band and narrow-band variations could be realized, by modifying the rugate parameters. Such variations and alternate embodiments are contemplated, and can be made without departing from the spirit and scope of the invention as defined in the appended claims.

I claim:

1. A polarizing beamsplitter, suitable for splitting a non-collimated light beam, comprising:
   an optical medium; and
   a rugate filter on a surface embedded in said optical medium in the path of the beam, said rugate filter having an average index of refraction at each position on said surface and a period at each position on said surface;
   wherein at least one of said average index of refraction and said period varies with position on said surface to compensate for variations in incident angle across the non-collimated light beam.

2. The polarizing beamsplitter of claim 1, wherein both said period and said average index of refraction vary across the surface of said rugate in a manner determined to compensate for variations in the angle of incidence across the non-collimated beam.

3. The polarizing beamsplitter of claim 1, wherein said period varies according to the relationship:

$$P(\theta_s) = \frac{\lambda}{2n_a(\theta_s)}, \; n_a(\theta_s) = \sqrt{2}\, n_s \mathrm{Sin}\theta_s$$

where P is said period, $\lambda$ is the line center of the pass wavelength of said rugate, $\theta_s(x,y)$ is the angle of a ray of the beam in the rugate at point (x,y), and $n_s$ is the index of refraction index of said optical medium.

4. The polarizing beamsplitter of claim 1, wherein said average index of refraction varies with position on the filter in a non-thickness dimension, to compensate for variations in incident angle across the light beam.

5. The polarizing beamsplitter of claim 2, wherein said period and said average index of refraction vary according to the relationship:

$$P(x,y) = \frac{\lambda}{2n_a(x,y)}$$

where P is said period, $\lambda$ is the line center of the pass wavelength of said rugate, (x,y) are position coordinates describing position on the surface of said rugate, and n(x,y) is the index of refraction of said rugate at each point x,y.

6. The polarizing beamsplitter of claim 3 wherein said optical medium is a solid, and said rugate filter is embedded in said solid at a 45 degree angle to a chief ray of the beam.

7. The polarizing beamsplitter of claim 6, wherein said optical medium comprises a pair of prisms joined on facing sides with said rugate filter disposed between said joined sides of said prisms.

8. The polarizing beamsplitter of claim 4, wherein said rugate filter is disposed at a non-orthogonal angle with respect to a chief ray of said beam, and said average index of refraction varies according to the equation $$n_a = \sqrt{2}\, n_s \left[1 - \frac{1}{\left\{\left(\frac{x}{y}\right)^2 + \left(\left(\frac{y}{f}\right)+1\right)^2 + 1\right\}}\right]^{\frac{1}{2}}$$

where x, y are Cartesian coordinates measured from an origin at the intersection of a chief ray and the rugate filter, f is the y coordinate from said origin of the focal point of the divergent beam, $n_a$ is the average index at the intersection of the chief ray with the rugate filter, and ns is the refractive index of the optical medium.

9. The polarizing beamsplitter of claim 4, wherein said average index of refraction varies approximately according to the relationship:

$$n_a = \sqrt{2} n_s \, \mathrm{Sin}\, \theta_s$$

where $n_a$ is the local average index at the intersection of a ray with the rugate filter, $n_s$ is the refractive index of the optical medium, and $\theta_s$ is the angle of incidence at the point of intersection with said rugate filter of a ray from the focal point of said beam.

10. The polarizing beamsplitter of claim 4 wherein said optical medium is a solid, and said rugate filter is embedded in said solid at a 45 degree angle to a chief ray of the beam.

11. The polarizing beamsplitter of claim 4, wherein said optical medium comprises a pair of prisms joined on facing sides with said rugate filter disposed between said joined sides of said prisms.

12. The polarizing beamsplitter of claim 4 wherein said rugate filter has a polarizing wavelength band which is substantially constant across its surface.

13. The polarizing beamsplitter of claim 12 wherein said rugate filter has an oscillating index variation in the thickness direction with amplitude which varies in relation to position in the non-thickness dimensions, to maintain approximately constant bandwidth across the rugate filter.

14. The polarizing beamsplitter of claim 13 wherein said oscillating index variation also has an apodizing amplitude envelope.

15. A method of fabricating a rugate polarizing beamsplitter, suitable for splitting a non-collimated beam of light rays, comprising the steps of:

depositing multiple layers of at least two materials, a first material having a relatively higher index of refraction, and a second material having a relatively lower index of refraction;

modulating the relative amounts of said first and second materials deposited so as to produce a surface coating with oscillating higher and lower index in its thickness dimension; and varying an average refractive index of said coating as a function of position on the surface of said coating in its non-thickness dimensions to compensate for variations in incident angle for the rays of the non-collimated light beam.

16. The method of claim 15, wherein said depositing step includes depositing said materials onto a surface of a substrate while said substrate spins in a substantially circular arc; and wherein at least one of said materials is deposited through a mask with aperture which varies in relation to the radial direction of said circular arc.

17. The method of claim 15, wherein said average index of refraction varies according to the equation:

$$n_a = \sqrt{2}\, n_s \left[ 1 - \frac{1}{\left\{ \left(\frac{x}{y}\right)^2 + \left(\left(\frac{y}{f}\right) + 1\right)^2 \right\}} \right]^{\frac{1}{2}}$$

where x, y are cartesian coordinates measured from an origin defined on said surface, f is the y coordinate from said origin of a focal point of the beam, $n_a$ is the average index of said coating at said origin, and $n_s$ is the refractive index of the optical medium.

18. The method of claim 15 wherein first material is chosen from the group consisting of $TiO_2$ and $Nb_2O_5$.

19. The method of claim 15, wherein said second material is chosen from the group consisting of $SiO_2$ and $Al_2O_3$.

20. The method of claim 16, wherein said circular arc has a center which is located off of the surface of said substrate.

21. The method of claim 16, wherein said at least two coating materials are both deposited through masks having apertures which vary in relation to said radial dimension, and the coating is applied by varying the relative amounts of said materials at each layer to produce a coating with an oscillating index of refraction, said oscillating index having an amplitude envelope which varies across the surface according to a function which produces a substantially constant pass bandwidth across the coating for said divergent beam.

22. The method of claim 21, further comprising the step of:

further modulating the oscillating index of refraction of said coating in the thickness direction with an apodizing amplitude envelope superimposed on said oscillating index of refraction.

23. A polarizing beamsplitter, comprising:

a pair of prisms, joined on facing sides to form an optical medium for a non-parallel incident beam; and a rugate filter disposed between said joined sides of said prisms;

said rugate filter having an average index of refraction, averaged over variations in a thickness direction, which varies according to position on said rugate filter to compensate for variations in incident angle of said non-parallel incident beam.

24. The polarizing beamsplitter of claim 23, wherein said average index of refraction varies to compensate for a conically divergent incident beam; and wherein said rugate filter reflects an S-polarized, narrow wavelength band of said divergent incident beam for all rays within a cone of said beam.

25. The polarizing beamsplitter of claim 23 wherein said average index of refraction varies to compensate for a conically divergent incident beam; and wherein said rugate filter transmits P-polarized, broad wavelength band of said divergent incident beam, for all rays within a cone of said beam.

* * * * *